US007820112B2

(12) United States Patent
Noda et al.

(10) Patent No.: US 7,820,112 B2
(45) Date of Patent: Oct. 26, 2010

(54) METHOD AND APPARATUS FOR MANUFACTURING BEADS ARRAY CHIP

(75) Inventors: Hideyuki Noda, Kokubunji (JP); Yoshinobu Kohara, Kokubunji (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 12/289,021

(22) Filed: Oct. 17, 2008

(65) Prior Publication Data

US 2009/0149350 A1 Jun. 11, 2009

Related U.S. Application Data

(62) Division of application No. 10/788,440, filed on Mar. 1, 2004, now Pat. No. 7,445,755.

(30) Foreign Application Priority Data

Jun. 27, 2003 (JP) ............................ 2003-185583

(51) Int. Cl.
*B01L 3/02* (2006.01)

(52) U.S. Cl. ........................... 422/100; 422/63; 422/65; 422/99; 422/102; 436/54; 436/180

(58) Field of Classification Search ............. 422/63–64, 422/99–100, 65, 102; 436/180, 54
See application file for complete search history.

(56) References Cited

U.S. PATENT DOCUMENTS 6,497,155 B1 * 12/2002 Feygin et al. ............ 73/863.22

FOREIGN PATENT DOCUMENTS

JP 11-243997 9/1999
JP 2000-346842 12/2000

OTHER PUBLICATIONS

"Light-Directed, Spatially Addressable Parallel Chemical Synthesis" by Stephen Fodor, et al. pp. 767-773.

Science vol. 270. Oct. 20, 1995 pp. 467-470.

Nature Biotechnology vol. 18, 2000. "Microarray fabrication with colvalent attachment of DNA using Bubble Jet technology", pp. 438-441.

Clinical Chemistry, vol. 43, pp. 1749-1756, (1997) "Advance multiplexed analysis with the Flow Metrix system".

Science, vol. 287. pp. 451-452 (2000).

"DNA probes on beads arrayed in a capillary, 'Bead-array', exhibited high hybridization perform", Nucleic Acids Research, 2002, vol. 30 No. 16. pp. 1-7.

* cited by examiner

*Primary Examiner*—Jyoti Nagpaul
(74) *Attorney, Agent, or Firm*—Antonelli, Terry, Stout & Kraus, LLP.

(57) ABSTRACT

A bead array chip manufacturing process for manufacturing a bead array chip having plural kinds of beads arrayed in a predetermined order in, in a container having a plurality of first channels disposed substantially in parallel with each other and a second channel crossing the plurality of first channels, each of the first channels. The process including lowering a capillary inserted in the second channel and sucking and retaining one bead in one end of the capillary, lifting the capillary to position the beads retained in the one end of the capillary in a desired channel of the plurality of first channels, terminating the suction of the capillary, and generating a uniflow of a fluid in the second channel.

6 Claims, 17 Drawing Sheets

Suction
23
25
3
19
13b
12
13a
16
20
15
17
Suction
2
14
21
28
4
6
7
22
8
1
5
z
y

METHOD AND APPARATUS FOR MANUFACTURING BEADS ARRAY CHIP

CROSS REFERENCE TO RELATED APPLICATION

This application is a divisional application of U.S. application Ser. No. 10/788,440, filed Mar. 1, 2004, now U.S. Pat. No. 7,445,755 the contents of which are incorporated herein by references.

FIELD OF THE INVENTION

The present invention relates to a manufacturing process and apparatus of a bead array chip which introduces and disposes minute beads having a surface immobilized with a biomolecular probe one by one in a microfluidic channel formed in a bead array container.

BACKGROUND OF THE INVENTION

With the progress of the human genome project, a movement to understand a living body at the DNA level and utilize the knowledge thus obtained for disease screening or understanding of the life phenomenon has become active. Investigation of a gene expression condition is effective for understanding of the life phenomenon or genetic activity. As a powerful method for finding the gene expression condition, a so-called DNA chip, that is, a probe array having a number of DNA probes divided by kind and immobilized on a surface of a solid such as slide glass has recently been employed. Examples of a manufacturing method of a DNA chip include a method of synthesizing base oligomers having a designed sequence one by one in a plurality of divided cells by using photochemical reaction and lithography widely employed in a semiconductor industry (Science, 251, 767-773 (1991)) and a method of embedding plural kinds of DNA probes in sections, one probe in one section (Science, 270, 467-470 (1995); Nat. Biotechnol. 18, 438-441 (2000)).

Manufacture of a DNA chip by either one of the above-methods takes labor and time, leading to a high cost, because DNA probes must be immobilized onto respective arrays or base oligmers must be synthesized one by one in each array. These methods are accompanied with the drawbacks that the density of the probes differs with the section because they are disposed as liquid drops on the surface of a solid, combination of probe kinds cannot be easily changed, and manipulation of them is difficult for users.

With a view to overcoming the above-described problems, probe array having plural kinds of beads each having a DNA probe fixed thereon, that is, a bead array (Clinical Chemistry, 43, 1749-1756 (1997); Science 287, 451-452 (2000); Nucleic Acids Research 30, e87 (2002)) were proposed. When beads are used, a probe array free from variations in probe density by bead can be manufactured, because a chemical reaction in a solution can be utilized for the immobilization of the probe.

In a DNA chip, the kind of a probe is discriminated by the position where an oligomer is prepared or spotting position of each DNA probe or protein probe, while in the probe array using probe-immobilized beads, it is discriminated by using beads different in color (Clinical Chemistry, 43, 1749-1756 (1997); Science, 287, 451-452 (2000)) or by the arraying order of beads in the capillary (Nucleic Acids Research 30, e87 (2002)).

In a DNA chip, a sample to be analyzed is reacted with an oligomer or DNA immobilized onto the DNA chip while spending a half a day or all day for identification and quantitative analysis of plural kinds of DNAs contained in the sample. In a probe array having beads arranged in a capillary, that is, a bead array, on the other hand, a sample to be analyzed is forced to flow in a capillary. Bead array needs less time for genetic testing than the conventional method so that it is a measuring technique suited for use in medical sites such as hospitals. For example, in an infection requiring urgent diagnosis or a bacterial test, it is expected as rapid detecting means of an exogenous gene of a pathogenic microorganism genome not existing in the genome of the patient.

For industrialization of a bead array, it is essential to establish a method capable of selecting desired probe-immobilized beads, depending on the purpose of the test, and arraying them freely. A method of pouring beads, under control, in a capillary one by one by making use of the flow of a liquid (Japanese Patent Application Laid-Open No. Hei 11-243997); and a method of retaining one bead, among a plurality of beads introduced together with a solvent, in a microhole made in a sheet and permitting insertion of only one bead, transferring the sheet to a capillary or groove formed in a plate, and thus arranging the beads one by one (Japanese Patent Application Laid-Open No. 2000-346842) were proposed so far.

Non-patent Document 1: Science, 251, 767-773 (1991)
Non-patent Document 2: Science, 270, 467-470 (1995)
Non-patent Document 3: Nat. Biotechnol. 18, 438-441 (2000)
Non-patent Document 4: Clinical Chemistry, 43, 1749-1756 (1997)
Non-patent Document 5: Science, 287, 451-452 (2000),
Non-patent Document 6: (Nucleic Acids Research 30, e87 (2002)
Patent Document 1: Japanese Patent Application Laid-Open No. Hei 11-243997
Patent Document 2: Japanese Patent Application Laid-Open No. 2000-346842

SUMMARY OF THE INVENTION

The conventional bead array manufacturing methods however involve problems in reliability and ease of manipulation, because air bubbles often disturb smooth introduction of beads in a capillary.

An object of the present invention is to provide a bead array manufacturing apparatus and manufacturing method by introducing and arraying, in a predetermined order, beads having a desired biomolecular probe such as DNA, RNA or protein immobilized thereon in a bead array container and forming a two-dimensional bead array on one chip in a convenient manner.

In the present invention, a bead capturing capillary capable of moving while sucking beads in an end of the capillary is used as manipulating means for taking out beads from a storing portion of a bead storing plate one by one and transferring it to a desired position. An optically transparent glass or resin container (bead array container) having a structure in which a bead disposing channel wide enough to permit passage of only one bead and a capillary passage wide enough to permit passage of the bead capturing capillary and serving as a guide of the bead capturing capillary cross each other is prepared as a container for retaining and arraying a plurality of beads in a predetermined order.

The bead capturing capillary has an inner diameter smaller than the diameter of the bead and an external diameter greater than the diameter of the bead but not greater than twice as much as the diameter of the bead. The bead capturing capillary is, at one end thereof, connected to a suction pump to generate a suction force at the end of the capillary. Members are disposed so that m pieces of bead capturing capillaries are each inserted from one end of the capillary passage of each of m pieces of bead array containers and the end of each capillary and each storing portion of the bead storing plate keep an opposite positional relationship therebetween. Both ends of the bead disposing flow channel of the bead array container are linked to a water feed system and water suction pump, respectively to cause a water flow in the flow channel.

A bead is captured from the storing portion of the bead storing plate by projecting the end of the bead capturing capillary from the lower end of the capillary passage of the bead array container, dipping it in the storing portion and then sucking one bead in the end of the capillary. Then, while the pressure inside of the bead capturing capillary having one bead retained in one end thereof is kept negative, the capillary is drawn back into the bead array container. When the one bead retained in the end of the capillary comes at the intersect between the capillary passage and bead disposing flow channel, the transfer of the bead capturing capillary is stopped and suction in the capillary by the suction pump is also stopped. At this time, the bead in the end of the capillary is still retained in the end by the vacuum condition inside of the capillary.

In the next place, pure water is fed from the water feed system linked to one end of the bead disposing flow channel, while pure water is sucked by the water suction pump linked to another end of the bead disposing flow channel. By making use of the water flow thus generated in the flow channel, the bead is physically released from the end of the bead capturing capillary to the bead disposing flow channel. The bead disposing flow channel has, at one end thereof, a dam. The bead thus introduced remains in the flow channel, blocked by the dam.

Desired beads can be introduced into the bead disposing flow channel of the bead array container one by one by the above-described series of operations. By specifying an intended position on the bead storing plate and arraying the desired beads, one by one, in the bead disposing flow channel of the bead array container in the intended order, a bead array chip having a biomolecular probe immobilized thereon can be manufactured efficiently and inexpensively without failure.

In one aspect of the present invention, there is thus provided a bead array chip manufacturing apparatus, which is equipped with a stage for supporting a bead storing plate having a plurality of bead storing portions, a stage driving portion for driving the stage, a container retaining portion for retaining a container which has a plurality of first (penetrated) channels disposed substantially in parallel with each other and a second (penetrated) channel crossing with the plurality of first channels, a capillary which is movable and passes through the second channels of the container, a capillary driving portion for vertically moving the capillary, suction means connected to the upper end of the capillary and generates a suction force at the lower end of the capillary, fluid circulating means for generating a uniflow of the fluid in the first channels of the container supported at the container retaining portion, and a controlling portion for controlling the stage driving portion, capillary driving portion, suction means and fluid circulating means; and manufactures a bead array chip in which beads stored respectively in the plurality of storing portions of the bead storing plate are arranged in a predetermined order in the first channels of the container.

The bead array chip manufacturing process according to the present invention is a process for manufacturing a bead array chip having plural kinds of bead arrayed in a predetermined order in—in a container having a plurality of first channels disposed substantially in parallel with each other and a second channel crossing the first channels—each of the first channels, which comprises lowering the capillary inserted in the second channel and retaining one bead sucked in one end of the capillary; lifting the capillary to position the bead retained in the one end of the capillary in the desired channel among the plural first channels; terminating the suction of the capillary; and generating a uniflow of a fluid in the first channels.

DETAILED DESCRIPTION OF THE INVENTION

The embodiments of the present invention will hereinafter be described based on accompanying drawings.

Figure 1:
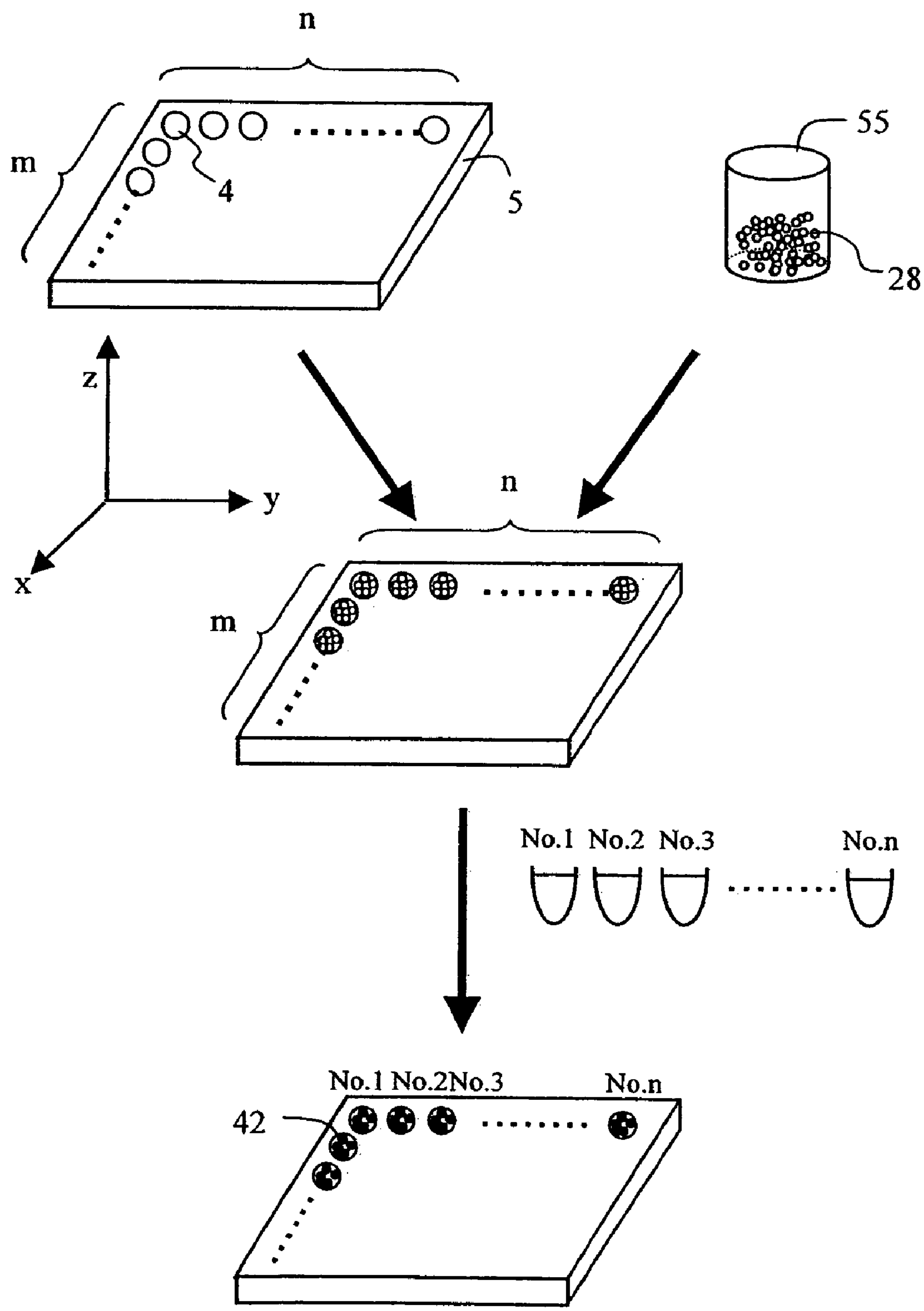
FIG. 1 is an explanatory view illustrating a bead preparing method and one structure example of a bead storing plate.

Referring to FIG. 1, a preparation process of a bead 28 is described. A bead storing plate having m×n storing portions, a plurality of beads, and a plurality of biomolecular probes such as DNA, RNA or protein for modifying the bead are prepared. The storing portions 4 on the bead storing plate 5 are disposed in the direction of x at predetermined, equally-spaced center distances (first predetermined center distances) and in the direction of y crossing at right angles with the direction of x at predetermined, equally-spaced distances (second predetermined center distances). The storing portions 4 each has a columnar shape with an upper circular opening, a central axis parallel to the direction of z, and a bottom. As the bead storing plate 5 having such plural storing portions 4, a commercially available 384-well microtiter plate can be used, for example. As beads, those having a substantially equal diameter are prepared simultaneously. The size of the beads depends on the maximum diameter or minimum diameter of the capillary which can be used stably as bead manipulation means. It is preferred to use spherical beads having a diameter of from about several μm to several hundred μm, preferably from about 10 μm to 500 μm from the viewpoint of using the beads having a surface area wide enough to fix, to the surface of the bead, the amount of the biomolecular probe detectable from one bead by fluorescent detection. For ease of the following explanation, the external diameter of the bead is assumed to be 100 μm.

From a bead container 55, several mg of beads are dispensed by a medicine spoon to each of m×n pieces of the storing portions 4 of the bead storing plate 5. Probes are introduced into the storing portions 4 so as to become different in kind by row, or different kinds of probes are introduced into the storing portions, respectively, followed by immobilization of the probes onto the surfaces of all the beads. By this operation, the bead storing plate 5 having plural kinds of probe-immobilized bead groups 42 stored therein can be prepared. The probe-immobilized bead groups are different in the kind of probes, depending on the position of the storing portions 4. In this embodiment, n kinds of biomolecular probes are prepared and they are immobilized onto beads stored in storing portions by introducing No. 1 biomolecular probes in m pieces of storing portions in the first row, No. 2 biomolecular probes in m pieces of storing portions in the second row, . . . and No. n biomolecular probes in m pieces of storing portions in the n-th row. When the probe immobilized onto bead is a biomolecule which is relatively chemically stable such as DNA, the bead storing plate 5 can be stored in a desiccator or a refrigerator. The bead storing plate 5 having a solvent such as pure water introduced in each storing portion 4 is disposed on a stage for bead storing plate of a bead array chip manufacturing apparatus which will be described later.

Figure 2:
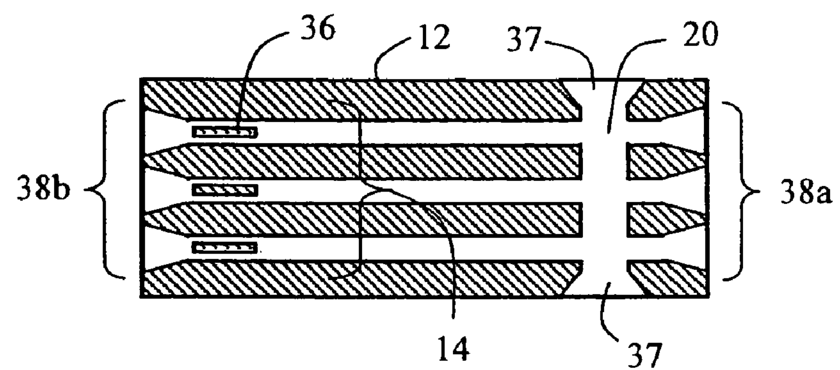
FIG. 2 is a schematic explanatory view of a container for a bead array chip.
Figure 2:
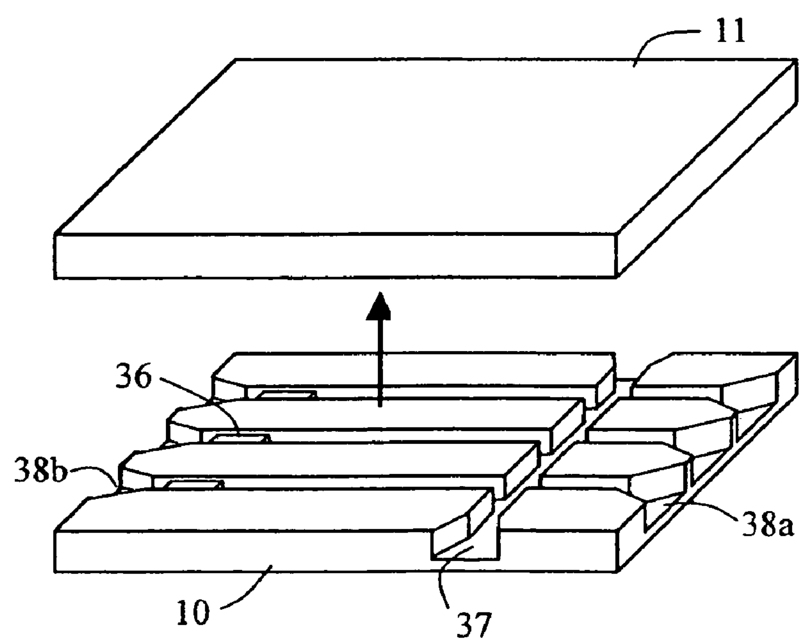

FIG. 2 is a schematic explanatory view of a bead array chip manufacturing container, in which FIG. 2A is a planar view of a substrate constituting a bead array container, while FIG. 2B is an exploded view of the bead array container.

The bead array container 12 can be manufactured by causing an unprocessed slide glass 11 to stick and adhere to a substrate 10 made of a quartz slide glass or pyrex slide glass, or made of PDMS on which a plurality of bead disposing flow channels 14 and a capillary passage 20 crossing at right angles thereto have been patterned by wet etching.

The plurality of bead disposing flow channels 14 have a cross-sectional area permitting passage of only one bead and are disposed parallel to each other. The bead disposing flow channels 14 each has a dam 36 to prevent outflow of beads to the terminal region which is opposite to the capillary passage 20. Between the dam 36 and the walls of bead disposing flow channel 14, a space is disposed so as not to block the channel. As will be described later, a liquid is introduced into the bead disposing flow channel 14 from an opening portion 38*a* on the upstream side toward an opening portion 38*b* on the downstream side and a bead is transferred by a liquid stream from the upstream side to the downstream side in the bead disposing flow channel 14.

Figure 3:
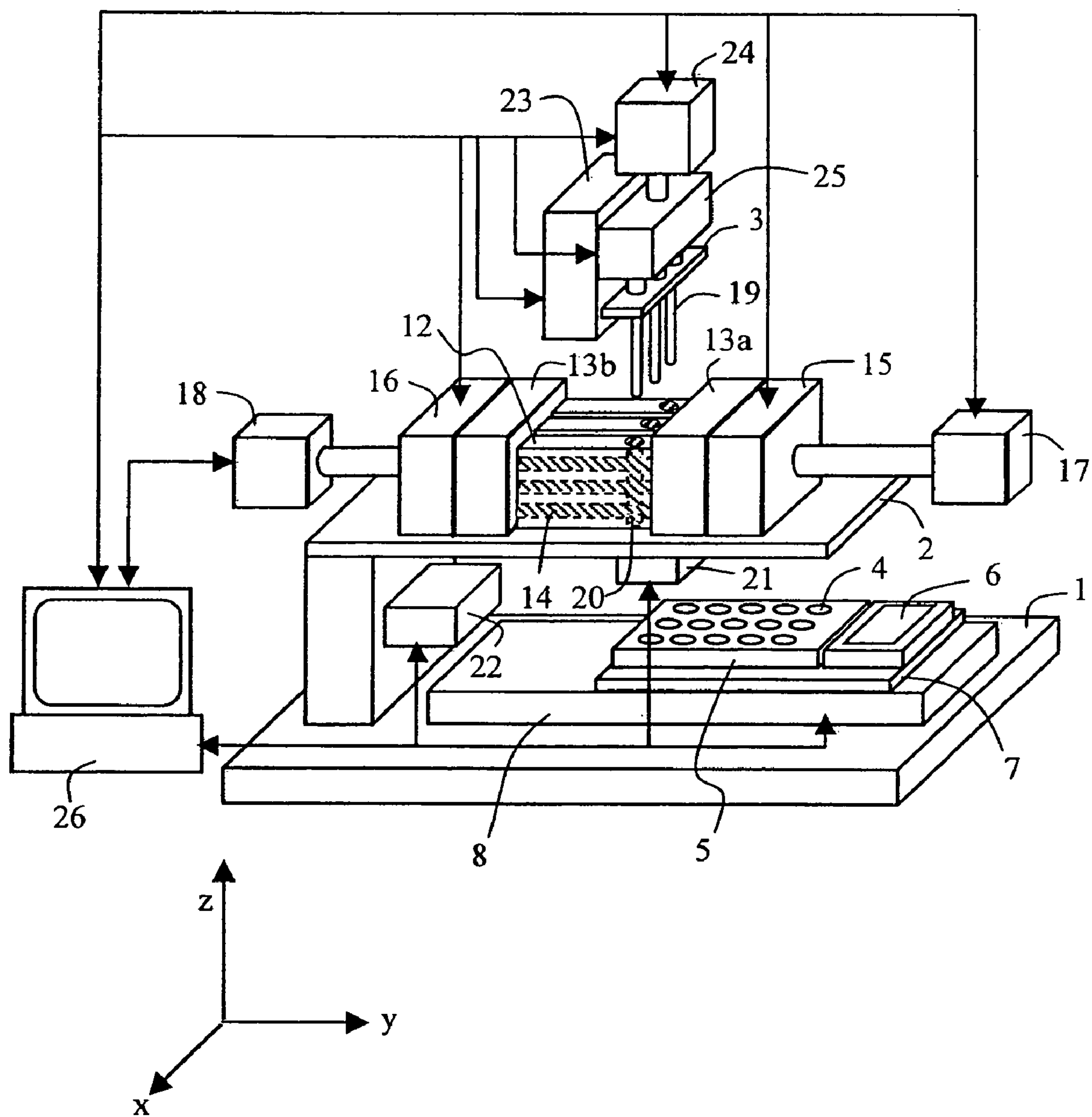
FIG. 3 is a schematic view of a bead array chip manufacturing apparatus according to the present invention.

FIG. 3 is a schematic view of one constitution example of a bead array chip manufacturing apparatus according to the present invention. This bead array manufacturing apparatus is equipped with a first plate member 1, a second plate member 2 and a third plate member 3.

On the first plate member 1, disposed via a first electric actuator 8 is a stage 7 which can be equipped thereon with a washing tank 6 and the above-described bead storing plate 5 having, in the plural storing portions 4 thereof, beads conjugated with a probe which is to bind to a biomolecule such as DNA, RNA or protein. The washing tank 6 contains a cleansing solution suited for preventing contamination. To heighten the cleansing effect further, an ultrasonic transducer is attached to the washing tank 6. For ease of description, a disposal example of a bead storing plate 65 having 3 storing portions in the x direction and 5 storing portions in the y direction, 3×5=15 storing portions 4 in total is illustrated. The position of the bead storing plate 5 and the position of the washing tank 6 are controlled by the first electric actuator 8 movable in the y direction.

The second plate member 2 has, on the upper portion thereof, cartridge-system container holders 13*a*,13*b* for setting the bead array container 12 therein, a first electromagnetic valve unit 15 for controlling the supply of pure water in all the bead disposing flow channels 14 in the bead array container 12 via the container holder 13*a*, and a second electromagnetic valve unit 16 necessary for sucking the pure water fed in the bead disposing flow channel 14 via the container holder 13*b*.

The first electromagnetic valve unit 15 is linked to the water feed system 17, while the second electromagnetic valve unit 16 is linked to a first suction pump 18. In the container holders 13*a*, 13*b*, a channel is formed which is designed to be connected to the bead disposing flow channel 14.

At the lower part of the second plate member 2, disposed is a third electromagnetic valve unit 21 for opening or closing the opening end of the capillary passage 20 in the bead array container 12 through which the bead capturing capillary 19 attached to the third plate member 3, which will be described in detail later, is inserted and transferred.

For ease of explanation, an example of FIG. 3 shows disposal, in the container holders 13*a*,13*b*, of three bead array containers 12 arrayed in the x direction. In the practical constitution using a 384 (16×24) well microtiter plate as the bead storing plate 5, 16 bead array containers 12 in the form of a slide glass having a size of 25 mm×75 mm and thickness of 3 mm are disposed at center distance of 4.5 mm so that the edge of the containers is on the x-y plane and the longitudinal side runs along the y direction.

On the third plate member 3, a plurality of bead capturing capillaries 19 having an inner diameter large enough for sucking only one bead in the end of each of the capillaries are arrayed and fixed in one line in the x direction, with the center axes set vertical to the plate member 3. The distance between center axes of the plurality of bead capturing capillaries 19 is designated as a first predetermined center distance. The third plate member 3 is controlled by a second electric actuator 23.

To suck and retain only one bead in the end portion of each of the bead capturing capillaries, it is only necessary to satisfy the following relationships: $ID \ll R$ and $R \leqq OD < 2R$ wherein ID represents the inner diameter of the bead capturing capillary 19, R represents a radius of bead, and OD represents the external diameter of each of the bead capturing capillaries. Use of a glass or stainless capillary having an inner diameter of 50 μm and an external diameter of 100 or 150 μm is suited when the bead has a radius of 100 μm. One end of the bead capturing capillary 19 is linked to a second suction pump 24 via a fourth electromagnetic valve unit 25.

In the bead array container 12, the capillary passage 20 which is an induction passage of the bead capturing capillary 19 and the bead disposing flow channel 14 for disposing beads are formed. The capillary passage 20 is formed in the z direction of FIG. 3 and the bead disposing flow channel 14 is formed in the y direction of FIG. 3. In the bead array container 12, the capillary passage 20 and the bead disposing flow channel 14 cross each other.

To array a plurality of beads in the bead disposing flow channel 14 of the bead array 12 while sucking beads one by one therein and retaining the sucking order of the beads, it is only necessary to satisfy the following relationship: $R < X < ((2+\sqrt{2})/2)R$, in which X represents each of the two widths of the bead disposing flow channel 14 when the flow channel is in the form of a quadratic prism. The capillary passage 20, on the other hand, must have a width enough for inserting the bead capturing capillary 19 therein so that it is necessary to satisfy the following relationship: $OD < X'$, wherein X' represents each of the two widths of the capillary passage 20 when the passage is in the form of a quadratic prism. For example, it is preferred to use a bead array container 12 with the bead disposing flow channel 14 having a width X of 130 μm, and the capillary passage 20 having a width X' of 200 μm.

For confirmation whether the bead is retained in the end of the bead capturing capillary 19 or not, an image sensor 22 is disposed at a position sandwiched by the first plate member 1 and the second plate member 2, that is, at an intermediate position of the reciprocating movement of the bead capturing capillary 19 between the bead storing plate 5 and the bead array container 12. The number of the lenses for the image sensor 22 corresponds to the number of bead capturing capillaries 19 so that a plurality of single beads can be detected simultaneously.

The first electric actuator 8, second electric actuator 23, first suction pump 18, second suction pump 24, first electromagnetic valve unit 15, second electromagnetic valve unit 16, third electromagnetic unit 21, fourth electromagnetic valve unit 25 and image sensor 22 constituting the driving portion of the whole system illustrated in FIG. 3 are controlled totally by a computer (controller) 26.

Figure 4:
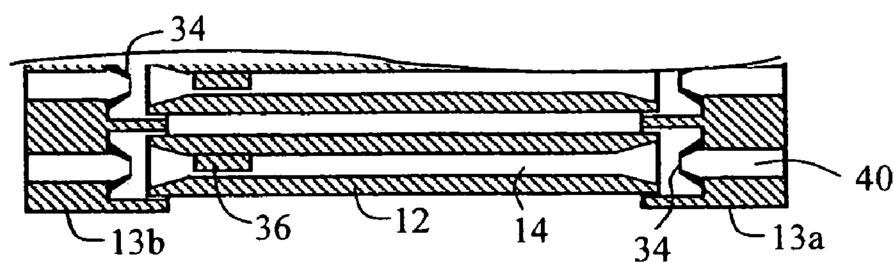
FIG. 4 is a schematic view illustrating the way how the bead array container is installed in the bead array chip manufacturing apparatus.
Figure 4:
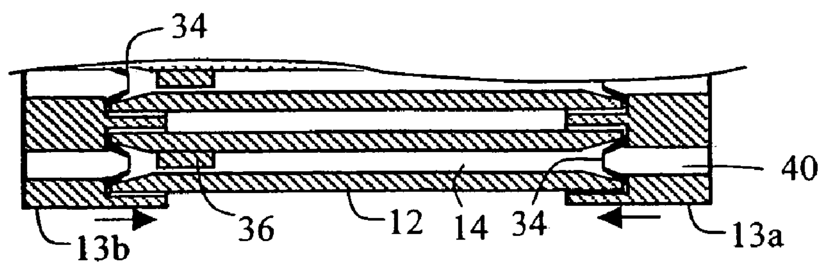
Figure 4:
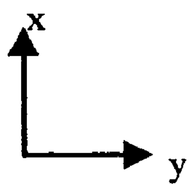

FIGS. 4A and 4B are schematic views illustrating the way how the bead array container is installed in the bead array chip manufacturing apparatus and it shows an x-y cross-section of the bead array container loaded on the bead array chip manufacturing apparatus of FIG. 3.

FIG. 4A illustrates the bead array container 12 illustrated in FIG. 2 installed in the cartridge-system container holders 13*a*,13*b* of the bead array manufacturing apparatus. The bead array container 12 is inserted in a concave portion of each of the container holders 13*a*,13*b*. As illustrated in FIG. 4B, then, the container holders 13*a*, 13*b* are pressed against the bead array container 12 to insert, in the bead disposing flow channel 14, a PDMS-made socket 34 existing at the end of the flow channel 40 in the container holders 13*a*,13*b*. This makes it possible to reliably link the flow channel 40 in the container holder to the bead disposing flow channel 14 on the bead array container 12. In this manner, the desired number of the bead array containers 12 are set in the container holders 13*a*,13*b*. The number of the bead array containers is usually the number corresponding to the number m of the storing portions in one row of the bead storing plate. In other words, m pieces of the containers are loaded.

A description will next be made of the operation procedure of the bead array chip manufacturing apparatus of the present invention.

Figure 5:
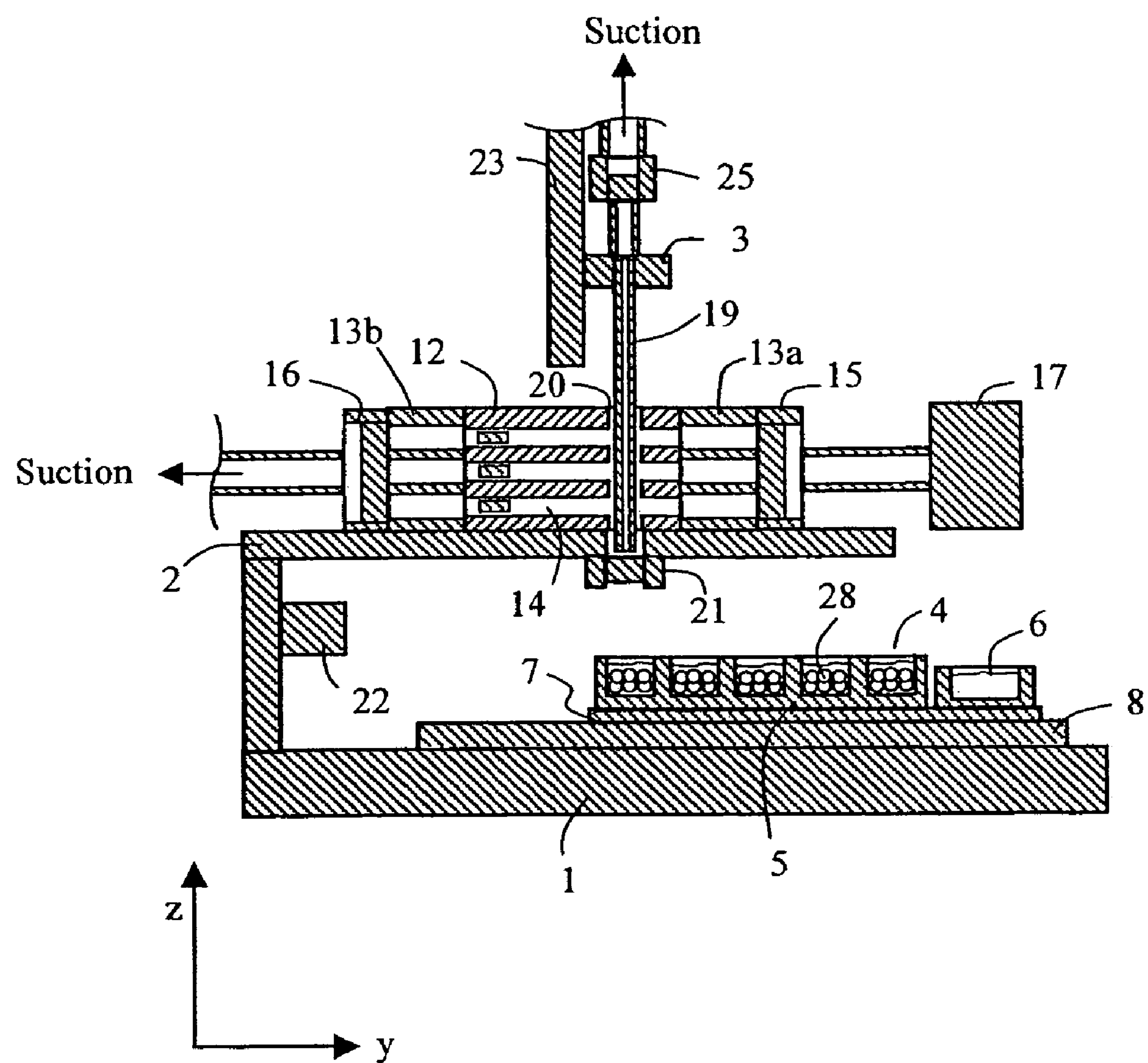
FIG. 5 illustrates the bead array chip manufacturing apparatus in the preset mode.

FIG. 5 is a schematic diagram illustrating the y-z cross-section of the bead array chip manufacturing apparatus in the preset mode. By turning on a computer 26, the whole system is in the preset mode and the first suction pump 18, second suction pump 24 and water feed system 17 start operation, while the first electromagnetic valve unit 15, second electromagnetic valve unit 16 and third electromagnetic unit 21 are closed. By the control of the second electric actuator 23, the third plate member 3 goes down and the bead capturing capillary 19 is introduced into the capillary passage 20 in the bead array container 12.

On the input screen of the computer 26, the number of the bead array container 12 and the storing portion 4 of the bead, which has an assigned inspection item, to be disposed in the container are selected. It is needless to say that a driving soft of the computer includes, as a default program, simple steps such as disposing beads, which are in the storing portion 4 of the bead storing plate 5, one by one in the bead disposing flow channel 14 along one direction of y. Clicking on the drive button of the computer is therefore enough for carrying out such simple steps.

Figure 6:
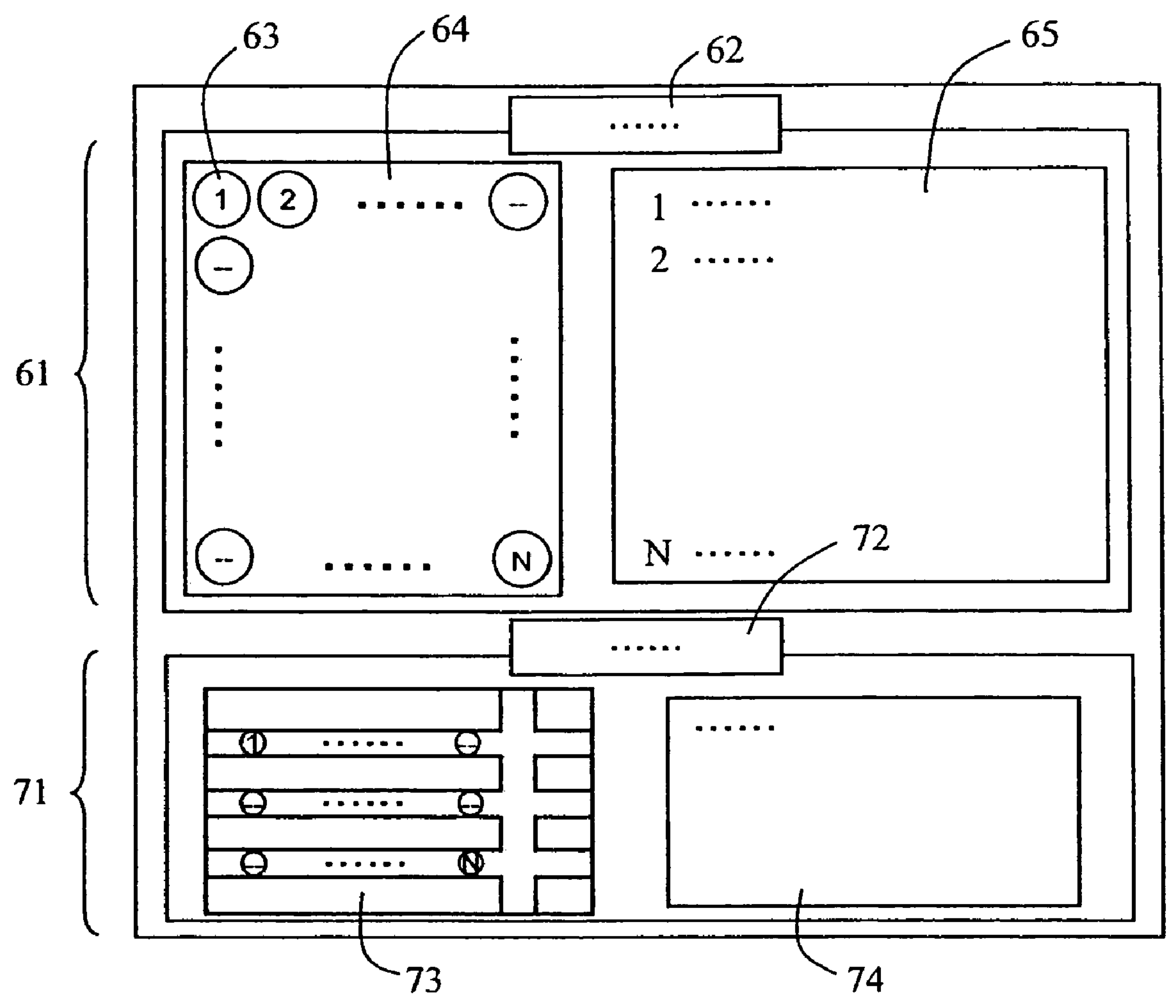
FIG. 6 illustrates an example of a display screen of a computer.

FIG. 6 illustrates one example of the display screen of the computer 26. Indicated on the upper side 61 of the display screen is the information of the bead storing plate, more specifically, ID 62 of a designated bead storing plate, a layout 64 indicating the layout of the storing portions of the bead storing plate with the storing portion number 63, and information (probe information) 65 of a bead stored in each storing portion. The information of the storing portion on the bead storing plate is linked with that of the bead so that a proper bead to be arrayed can be selected from the bead information display screen 65 (channel in which bead is arrayed is also selected). Information on the bead storing plate previously manufactured can easily be called up from the ID of the plate if it is registered in the computer.

On the lower side 71 of the display screen, manufacturing results (prediction) 73 of the bead array chip reflecting the information of the bead selected on the upper side of the screen are indicated together with the chip ID 72. Details 74 of the bead array chip are also indicated on the right side of the screen. The computer also has a function of showing the ID of the bead storing plate necessary for arraying, if the array results of the bead array chip manufactured before are registered in the computer. The detailed information of the bead array chip shown by the computer include test objects and the number of test items (the number of beads arrayed). The data on the screen can be printed out after the manufacture of the bead array chip so that not only the bead array chip but also its data can be provided to users simultaneously.

The correspondence between the ID of the bead storing plate having probe-immobilized beads stored therein in advance and the kind of the probe immobilized to the bead stored in each storing portion of the bead storing plate is saved in a memory. In addition, gene tests are classified by the name of a disease and the kinds of the probe necessary for each gene test are also stored in the memory. Then, by selecting the intended disease name from a plurality of disease names displayed selectably on the screen of the computer which controls the bead array chip manufacturing apparatus, it becomes possible to automatically and conveniently manufacture a bead array chip having probes necessary for a gene test of the disease.

It is preferred to provide users with the bead array chip in which probe-immobilized beads have been arrayed in a predetermined order, together with a storage medium containing the information on the kind of the probe immobilized to each bead stored in the chip.

When plural kinds of beads immobilized with a probe such as DNA, RNA or protein necessary for the test of a gene related to a certain disease, or plural kinds of the beads immobilized with a probe necessary for presumption of an exogenous gene of, for example, an infectious disease are prepared in advance in respective bead storing plates and stored under a chemically stable state, a bead array chip necessary in the medical site can be manufactured and provided for test immediately, by taking the bead storing plate from the stored place, installing it on the bead array chip manufacturing device, and then arraying the beads immobilized with probes necessary for the test of patients in the bead array container.

As is apparent from FIG. 3, the total number of beads disposed in the bead disposing flow channel 14 of each bead array container 12 depends on the number of the storing portions 4 arrayed along the y direction of the bead storing plate 5. If one bead storing plate 5 cannot cover all the inspection items, a stage 7 permitting loading of a plurality of bead storing plates 5 thereon can be used. Alternatively, a mechanism for loading a plurality of bead storing plates in turn can be used.

After completion of the above-described setting, automatic operation of the apparatus starts by clicking on a bead disposal starting button of the computer 26.

FIG. 7A to FIG. 7I are schematic cross-sectional views illustrating steps of taking out one bead 28 from a plurality of beads 28 stored in a certain storing portion 4 and introducing it in the bead disposing flow channel 14. The bead array container illustrated in these drawings are each formed of one capillary passage 20 and three bead disposing flow channels 14.

Figure 7:
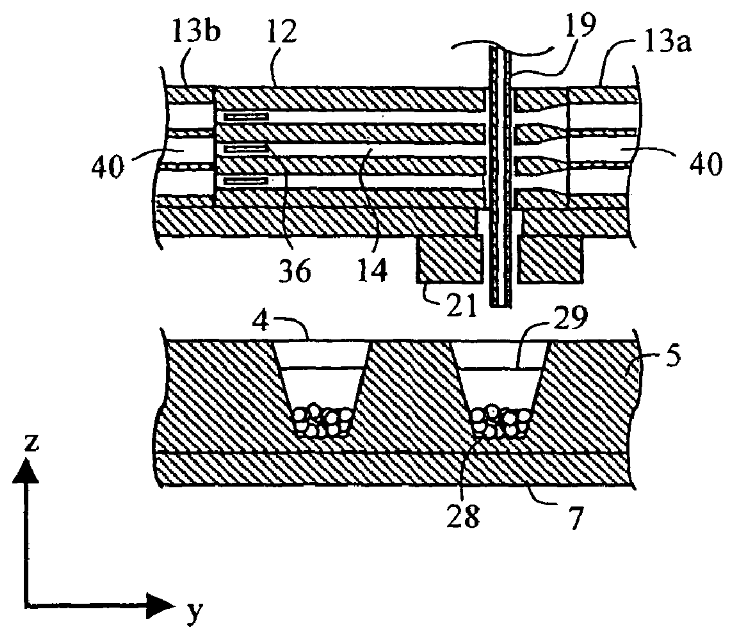
FIG. 7A illustrates a step of taking out one bead from the storing portion and introducing it into the bead disposing flow channel.
FIG. 7B illustrates the step of taking out one bead from the storing portion and introducing it into the bead disposing flow channel.
FIG. 7C illustrates the step of taking out one bead from the storing portion and introducing it into the bead disposing flow channel.
FIG. 7D illustrates the step of taking out one bead from the storing portion and introducing it into the bead disposing flow channel.
FIG. 7E illustrates the step of taking out one bead from the storing portion and introducing it into the bead disposing flow channel.
FIG. 7F illustrates the step of taking out one bead from the storing portion and introducing it into the bead disposing flow channel.
FIG. 7G illustrates the step of taking out one bead from the storing portion and introducing it into the bead disposing flow channel.
FIG. 7H illustrates the step of taking out one bead from the storing portion and introducing it into the bead disposing flow channel.
FIG. 7I illustrates the step of taking out one bead from the storing portion and introducing it into the bead disposing channel.
FIG. 7J illustrates a washing step of the end of the bead capturing capillary.
FIG. 7K illustrates the washing step of the end of the bead capturing capillary.
Figure 7:
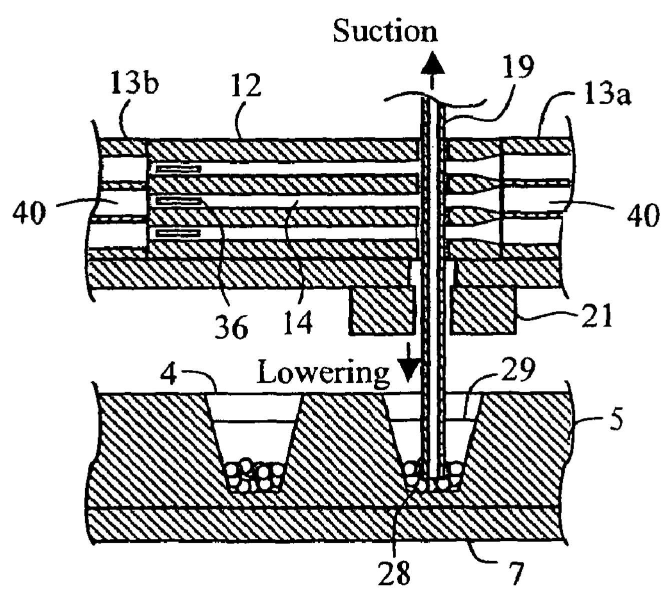
Figure 7:
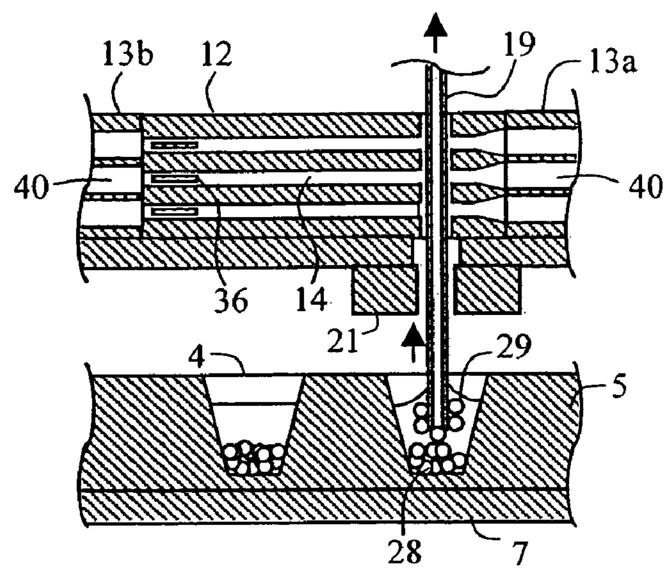
Figure 7:
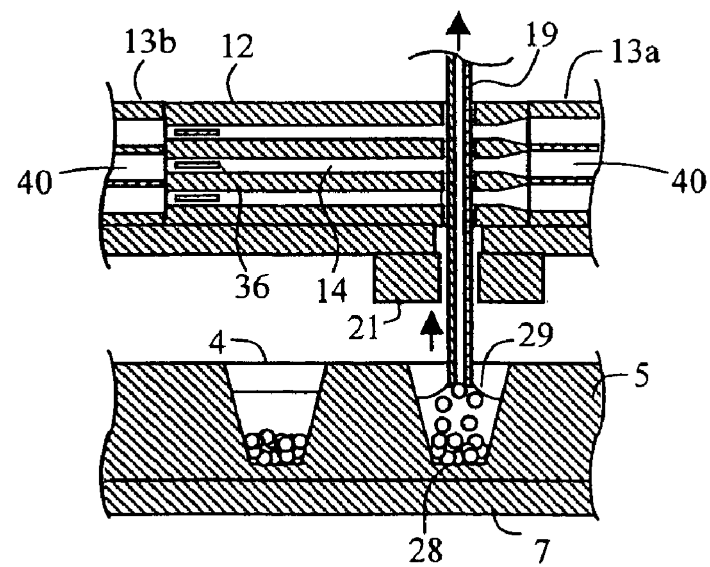
Figure 7:
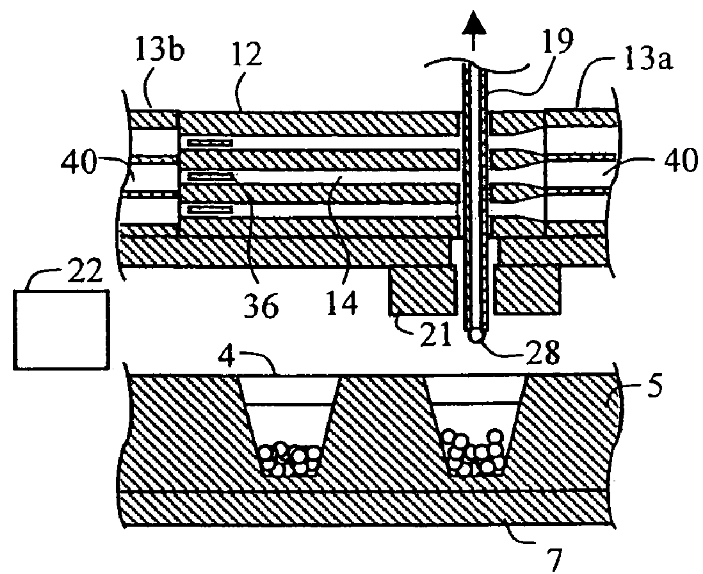
Figure 7:
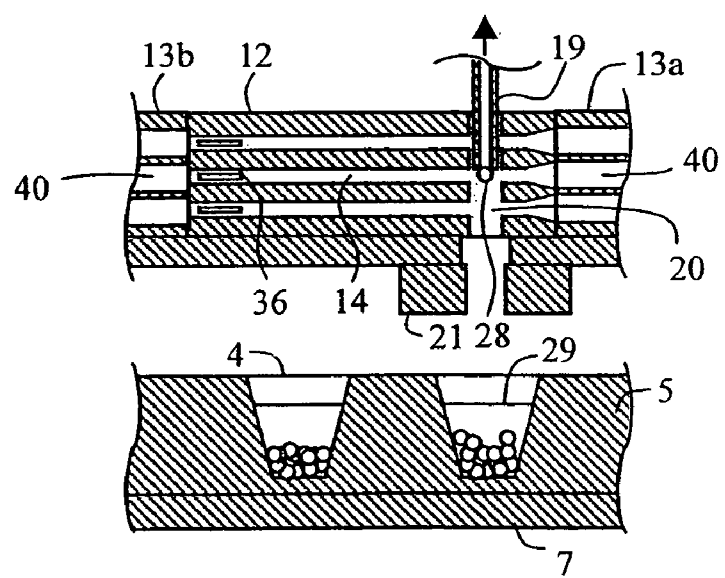
Figure 7:
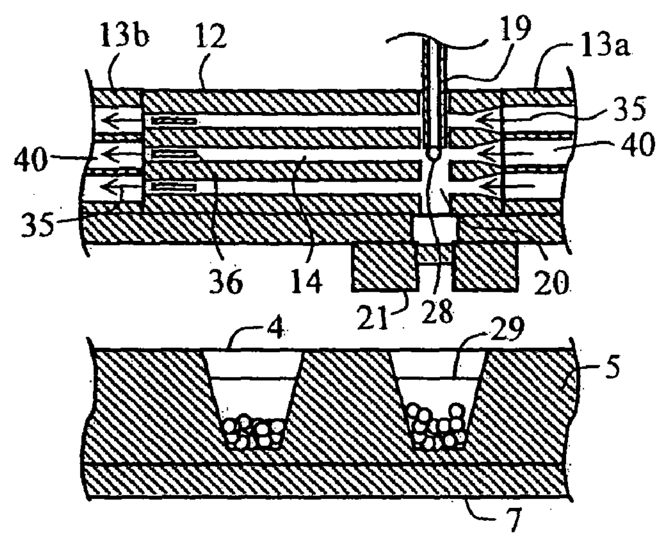
Figure 7:
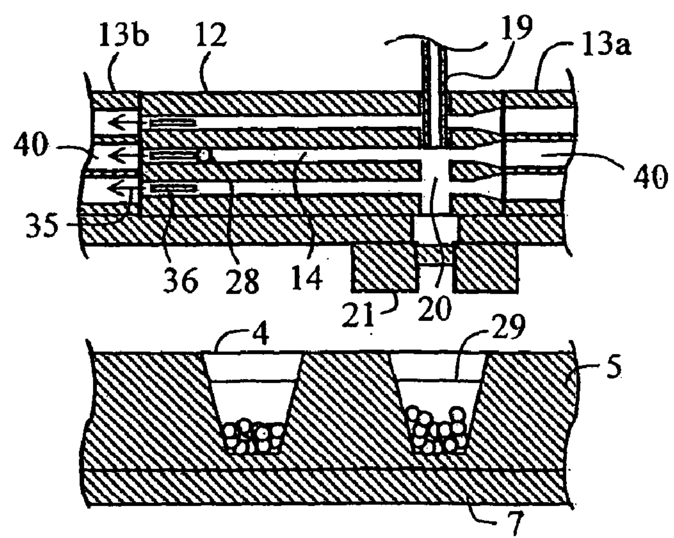
Figure 7:
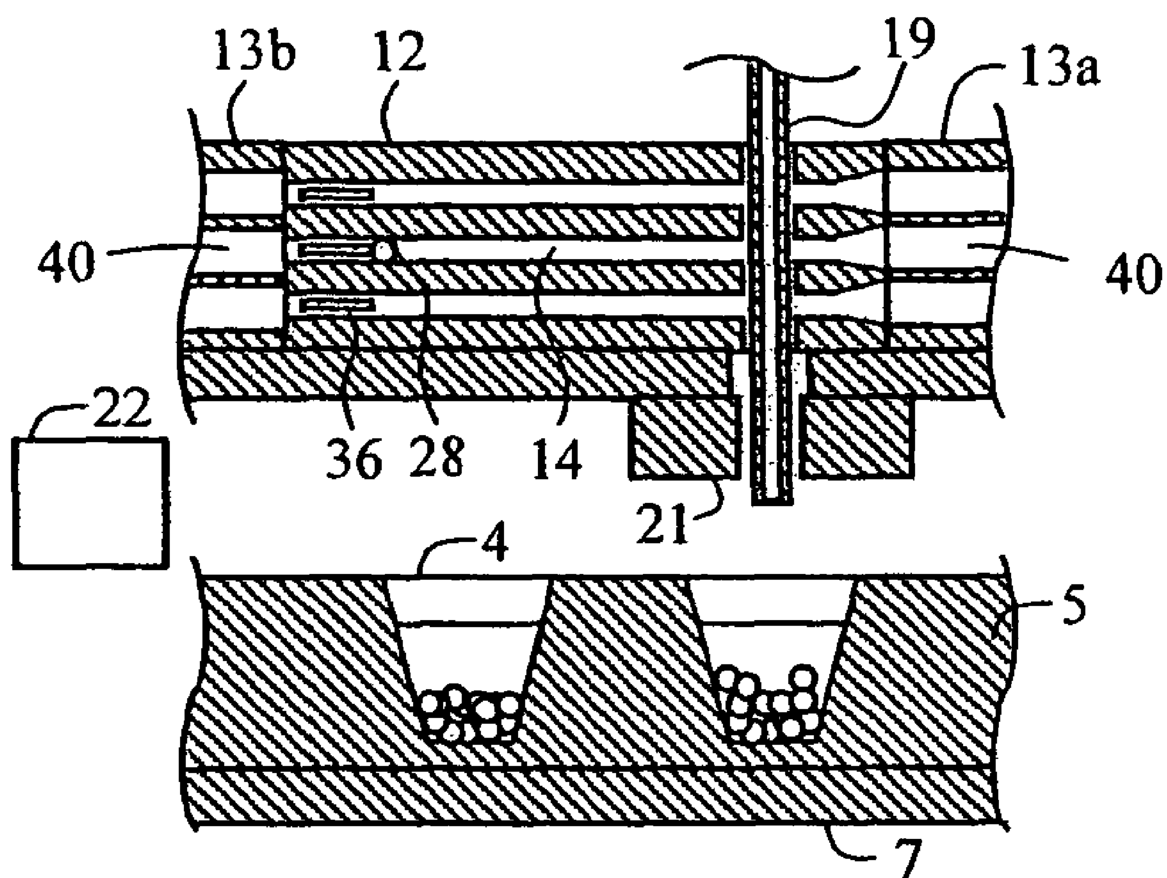
Figure 7:
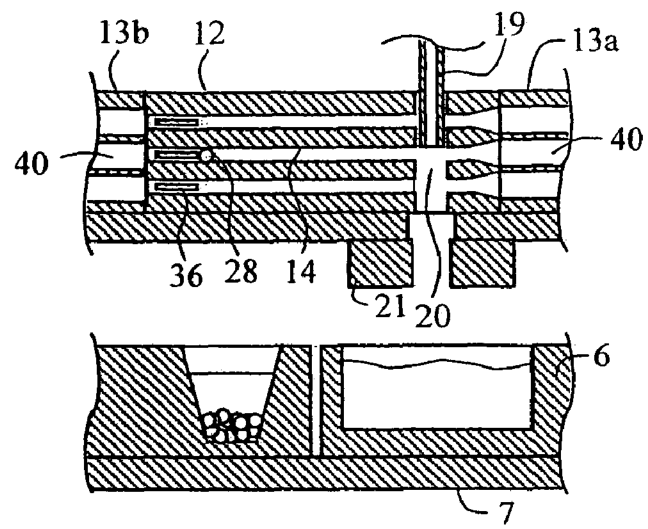
Figure 7:
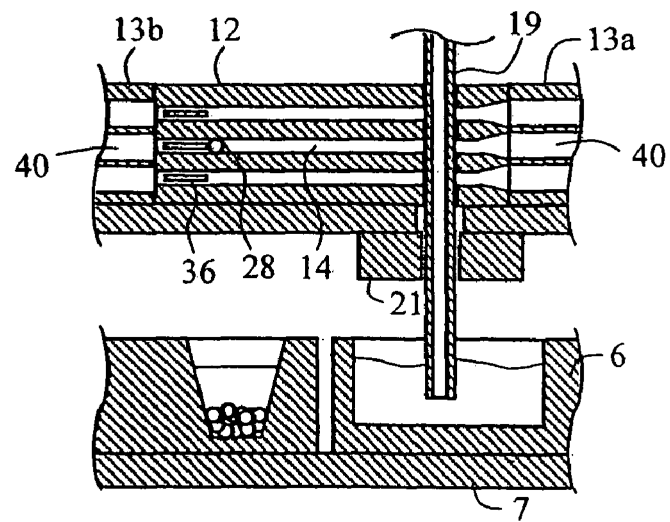

FIG. 7A illustrates the state after the stage 7 is transferred so that an opening of the storing portion 4 having the intended bead therein comes opposite to an opening of the bead capturing capillary 19 in the z direction by the control of the first electric actuator 8. The third electromagnetic valve unit 21 disposed below the second plate member 2 is opened. By the second electric actuator 23, the third plate member 3 is transferred in the z direction to project the end of the bead capturing capillary 19 from the lower end of the capillary passage 20 of the bead array container 12. This diagram illustrates immediately before the bead capturing capillary 19 is inserted into the intended storing portion 4.

As illustrated in FIG. 7B, the third plate member 3 moves downward in the z direction by the control of the second electric actuator 23 and the lower end of the bead capturing capillary 19 is inserted inside of the storing portion 4. At this time, the fourth electromagnetic valve unit 25 is opened to cause suction in the bead capturing capillary 19. In the procedure of FIG. 7B, the bead 28 is captured in the end of the bead capturing capillary 19. A plurality of beads 29 adsorb to not only the end of the bead capturing capillary 19 but also to its outside wall by electrostatic attraction.

FIGS. 7C to 7F illustrate a step of moving the bead capturing capillary 19 attached to the third plate member 3 in the z direction and pulling it back to the inside of the bead array container 12 by the control of the second electric actuator 23. FIG. 7C illustrates the bead capturing capillary 19 existing in pure water in the storing portion 4, leaving the beads 28 suspended on the bottom of the storing portion 4. At this time, a plurality of beads 28 adsorb to the opening portion and outside wall of the bead capturing capillary 19. FIG. 7D illustrates the bead capturing capillary 19 moved in the z direction more from that of FIG. 7C and the end portion of the bead capturing capillary 19 is just passing through a gas-liquid interface 29. A plurality of extra beads 28 which have adsorbed to the outer surface of the bead capturing capillary 19 are scaled off below the surface of water by the surface tension of the gas-liquid interface 29.

FIG. 7E illustrates the end of the bead capturing capillary 19 taken out completely from pure water of the storing portion 4 into the air. At this time, the bead capturing capillary 19 has, at an end thereof, only one bead 28. In the air, at an intermediate position of the transfer of the end of the bead capturing capillary 19 from the storing portion 4 to the capillary passage 20 in the bead array container 12, the image of the bead 38 in the end of the bead capturing capillary 19 is detected by the image sensor 22.

Figure 8:
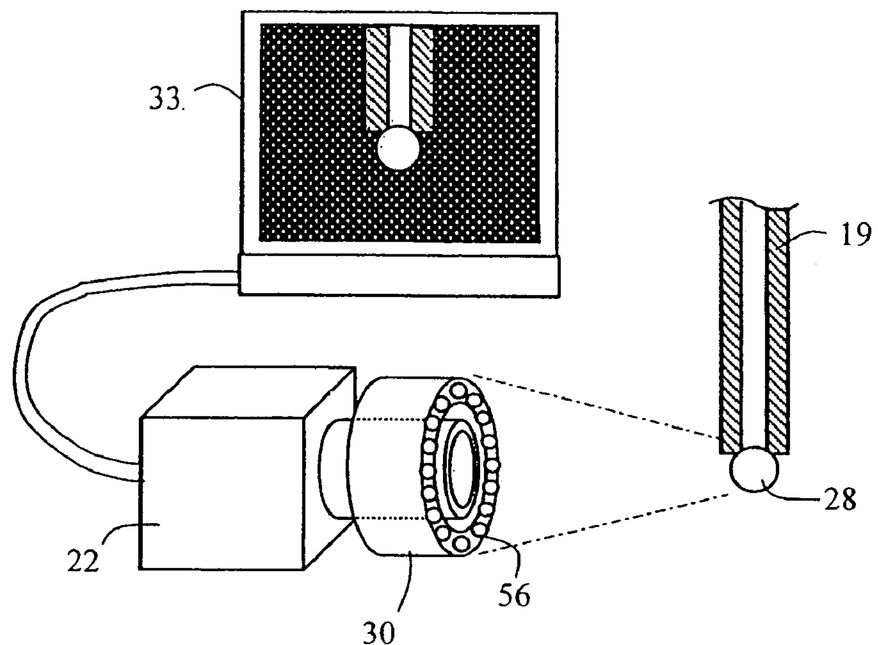
FIG. 8 is a schematic diagram for explaining an image detection method using an image sensor.
Figure 8:
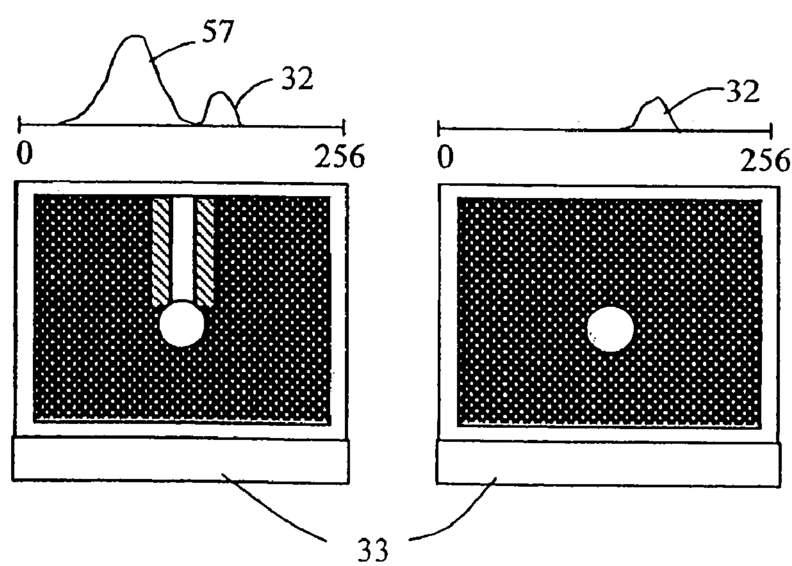

FIG. 8 is a schematic diagram for explaining an image detection method by the image sensor 22. FIG. 8A illustrates an example of constitution of an image detection system, while FIG. 8B illustrates the bead detected on the tonal range setting screen of a light and a sensor screen.

Image detection of a scattered light from the bead 28 may be performed by using illumination 30 with a white light emitting diode 56 and focusing on the bead 28 (FIG. 8A). By setting the program of the image sensor 22 in advance so as to cut the color gradation level 57 of a background light and leave only the color gradation level 32 of the scattered light of the bead, the scattered light emitted from one bead 28 can be detected on a sensor screen 33 in the form substantially reflecting the form of the bead 28 when the bead 28 is retained in the end of the bead capturing capillary 19 (FIG. 8B). When the bead 28 is not retained in the end of the bead capturing capillary 19, on the other hand, scattered light of a predetermined gradation level cannot be detected on the sensor screen 33. If the bead 28 is not detected by the image sensor 22, all the above-described steps FIGS. 7A to 7E are repeated again.

After the bead 28 is detected by the image sensor 22, the end of the bead capturing capillary 19 is transferred to the intersection of the capillary passage 20 and the bead disposing flow channel 14 in the bead array container by the control of the second electric actuator 23, as illustrated in FIG. 7F. FIG. 7F illustrates the bead capturing capillary 19 located at the second intersection of the three bead disposing flow channels 14 in the bead array container 12, counted in the z direction from the second plate member 2.

FIG. 7G and FIG. 7H are each a y-z cross-sectional view illustrating a step of introducing the bead 28 retained in the bead capturing capillary 19 into the bead disposing flow channel 14.

As illustrated in FIG. 7G, the fourth electromagnetic valve unit 25 is closed, whereby the suction in the bead capturing capillary 19 at the above-described intersection 34 by the second suction pump 24 is terminated. At this time, the bead 28 in the end of the bead capturing capillary 19 is still retained in the end under the vacuum condition inside of the capillary 19. Simultaneously with the control of the fourth electromagnetic valve unit 25, the third electromagnetic valve unit 21 is also closed.

Then, the first electromagnetic valve unit 15 is opened and pure water is fed from one end of the bead disposing flow channel 14 through the water feed system 17. At this time, the second electromagnetic valve unit 16 linked to another end of the bead disposing flow channel 14 is also opened and the pure water fed by the water feed system is then sucked by the first suction pump 18. By making use of a water stream 35 generated by the supply of the pure water and suction of the pure water thus fed, the bead 28 is physically scaled off from the end of the bead capturing capillary 19 and charged in the bead disposing flow channel 14 by this water stream 35.

In the bead disposing flow channel 14 of the bead array container 12, a dam 36 is disposed. The first bead introduced in the flow channel is disposed as illustrated in FIG. 7H, blocked by the dam 36.

According to the above description, FIG. 7F illustrates the bead capturing capillary 19 located at the second intersection of the three bead disposing flow channels 14 in the bead array container 12, counted in the z direction from the second plate member 2. In practice, a bead group having a desired sequence can be formed in any bead disposing flow channel 14 by the control of the third plate member 3 in the z direction. As a result, a bead array chip having two-dimensionally arrayed beads on a y-z plane is manufactured. In this Embodiment, only the results of the bead 28 arrayed in the second bead disposing flow channel 14 are described for brevity.

FIG. 7I illustrates the confirmation of the presence or absence of the bead 28 in end of the bead capturing capillary 19 by the image sensor 22 after completion of the introduction of the bead 28. When no bead 28 exists in the end of the bead capturing capillary 19 as a result of the image detection in FIG. 7I, the disposing step of one bead in the bead disposing flow channel 14 is completed. When the image sensor 22 judges that the bead 28 exists, on the other hand, steps illustrated in FIGS. 7F to 7I are repeated again.

The beads 28 contained in the storing portions 4 are immobilized with probes different in kind, depending on the line of the storing portions arrayed in the y direction of FIG. 3. By controlling the first electric actuator 8 to move the first plate member 1 by a desired distance in the y direction and successively change the storing portion 4 which can be selected freely by the movement in the y direction, and repeating the above-described operations as illustrated in FIG. 7A to FIG. 7I, the beads immobilized with different probes respectively can be disposed in the bead disposing flow channel 14 in the bead array container 12 in the desired order.

FIG. 7J and FIG. 7K each illustrates the washing step of the end of the bead capturing capillary 19 in the washing tank 6. After one bead 28 is introduced into the bead disposing flow channel 14 but before another bead 18 is taken out from the storing portion 4, the end portion of the bead capturing capillary 19 is dipped in a detergent in the washing tank 6 and washed therewith.

The steps as described above in FIG. 7A to FIG. 7K are fundamental for disposing one bead 28. Whenever the bead 28 is introduced in the flow channel based on the information on an classification index discriminated by the storing position of the bead storing plate 5 and stored in a computer in advance, the index and the number of beads 28 introduced in the bead disposing flow channel 14 in the bead array container 12 are recorded sequentially.

Figure 9:
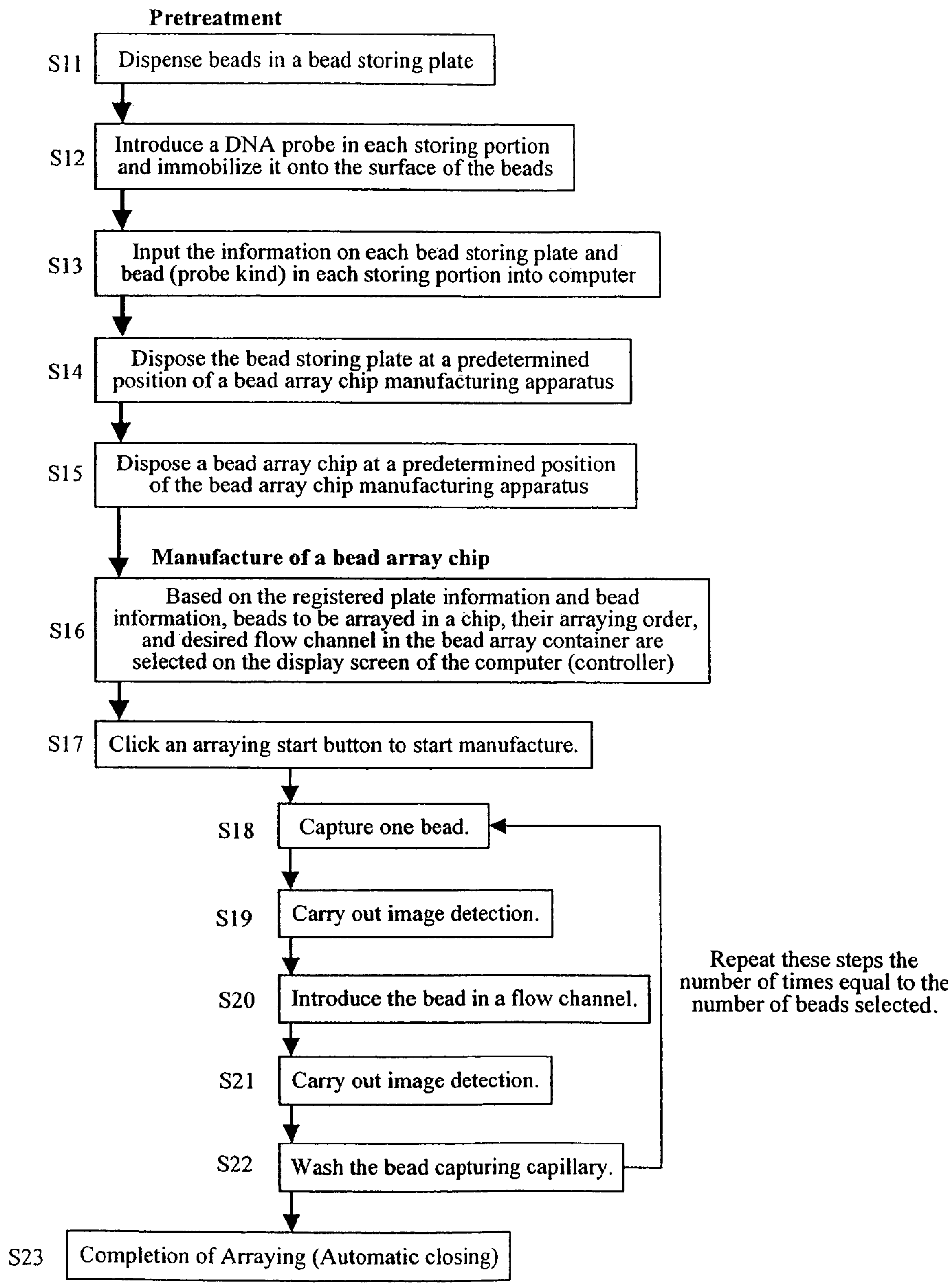
FIG. 9 is a flow chart of a manufacturing process of a bead array chip.

FIG. 9 is a flow chart of the manufacturing process of the bead array chip described above.

The manufacturing process of the bead chip array according to the present invention can be classified in two stages, that is, pretreatment and manufacture of a bead array chip. In the pretreatment, as illustrated in FIG. 1, minute beads are dispensed in each storing portion 4 of the bead storing plate 5 (S11) and biomolecular probe such as DNA probe is introduced in each storing portion 4 to immobilize it on the surface of the bead (S12). Then, the information on the bead storing plate and the bead (probe kind) in each storing portion are input in a computer (S13). A plurality of bead storing plates equipped with storing portions containing beads immobilized with biomolecular probes different in kind are prepared and they can be registered after ID numbering. Then, a desired bead storing plate 5 is disposed at a predetermined position on the stage 7 of the bead array chip manufacturing apparatus (S14) and the required number of bead array containers 12 are installed in the container holders 13*a*, 13*b* of the bead array chip manufacturing apparatus (S15).

In the next place, a bead array chip is manufactured using the bead array chip manufacturing apparatus.

Based on the registered plate information and bead information, beads to be arrayed in a container, their arraying order, and desired flow channel in a bead array container are selected on the display screen of the computer (controller) (S16) and an arraying start button is clicked (S17). Then, the bead array chip manufacturing apparatus automatically manufactures a bead array chip as designed. Described specifically, the bead capturing capillary 19 is moved downward to dip the end thereof in pure water in the intended storing portion 4 of the bead storing plate 5. After one bead is captured (S18), the capillary is moved upward. During this procedure, capture of one bead in the end of the bead capturing capillary 19 is confirmed by image detection (S19). After confirmation that the bead has been captured in the bead capturing capillary 19, the bead capturing capillary 19 is moved upward further to draw the bead in the bead array container. The bead is located at a predetermined bead disposing channel and then, introduced in the bead disposing channel by a water stream (S20). The bead capturing capillary 19 which has lost the bead from its end is moved downward below the bead array container in order to capture a next bead. During this descent, it is confirmed by image detection that the capillary has no bead in its end (S21). The end of the bead capturing capillary 19 is inserted and washed in the washing tank 6 (S22). The operations of from step 18 to step 22 are repeated the number of times corresponding to the number of beads, whereby the beads arraying operation is completed (S23). Upon use of the bead array chip thus manufactured, information (kinds of beads, arraying order) on the bead array chip is obtained from the computer and based on the information, a bead array chip is selected or test results are analyzed.

Figure 10:
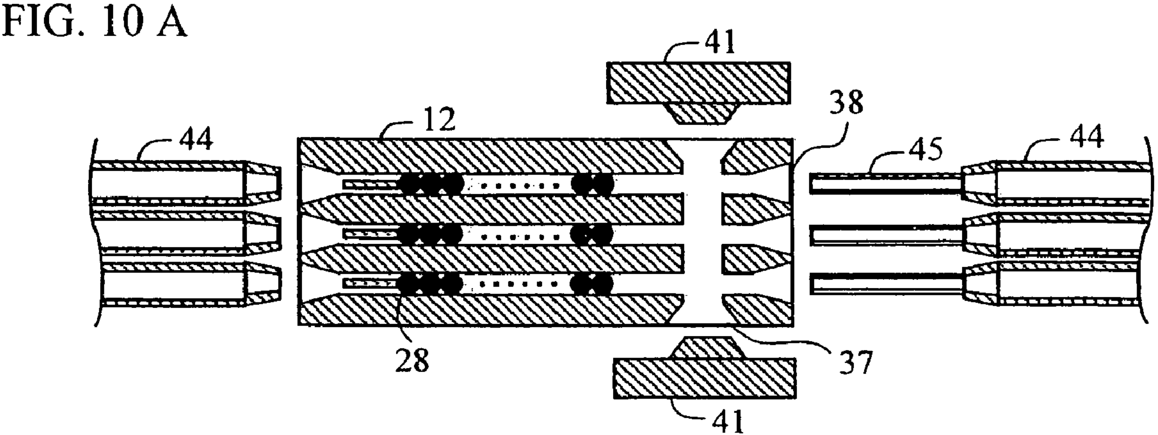
FIG. 10 is an explanatory view of a manner of attaching a sample introducing jig to a bead array container.
Figure 10:
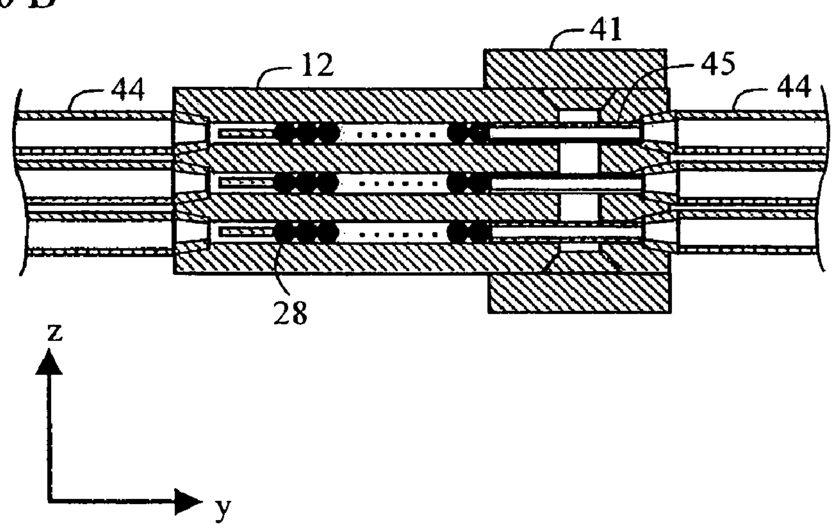

FIG. 10A and FIG. 10B are each an explanatory view illustrating an attaching method of a sample injection jig 44 to the bead array chip thus manufactured. After completion of the disposal of the beads 28, the bead array container 12 is removed from the container holders 13*a*, 13*b*, two opening portions 37 of the capillary passage are sealed with a PDMS-made exclusive cap 41. In the opening portion 38 of the bead disposing flow channel, the sample injection jig 44 for introducing a test sample is inserted.

The sample injection jig 44 is equipped with a sample injection capillary 45 having an inner diameter smaller than the external diameter of the bead. As illustrated in FIG. 10B, the end of the sample injection capillary 45 is designed so that it exists downstream of the intersection between the capillary passage 20 and the bead disposing flow channel 14. A joint of the sample injection jig 44 with the bead disposing flow channel is made of a PDMS material and it is adhered and fixed safely without causing leakage. FIG. 10B is also a diagram of the form employed when the bead array chip manufactured by the bead array chip manufacturing apparatus of the present invention is marketed as an inexpensive genetic testing tool. Users purchase the bead array chip, together with a storage medium including its specific data on the kinds of the probes immobilized on the beads in the chip and arraying order of the beads.

A description will next be made of a genetic testing method using the bead array chip thus manufactured. An example which will be described below is that of the use of a bead array chip having a DNA probe array, which has a desired sequence and is formed in the bead disposing flow channel 14, for the hybridization of a specific fluorescent-labeled target DNA on the DNA probe array.

In this Embodiment, 24 kinds of 18mer synthetic oligonucleotides which are different in the base sequence and have been modified with a 5'-thiol group were used as the probe DNA. In addition to the 24 kinds of the probe DNAs, another two kinds are prepared. They are a single stranded target DNA 49 having a Cy3-labeled sequence 3 and a single-strand target DNA 50 having a TexasRed-labeled sequence 4 complementary to the single-strand DNA probe-immobilized bead 47 which has been stored as a fifth bead in the bead disposing flow channel 14 and has Sequence 1 and a single-strand DNA probe immobilized bead 48 which has been stored as a tenth bead and has Sequence 2, respectively.

```
(Sequence 1) 5'-thiol-ATCT . . . CCTC
(Sequence 2) 5'-thiol-CTAC . . . GACG
(Sequence 3) 5'-Cy3-GAGG . . . AGAT
(Sequence 4) 5'-TexasRed-CGTC . . . GTAG
```

A preparation process of the bead 28 conducted prior to the disposal of the bead in the bead array container 12 will next be described. In this Embodiment, amino-modified glass beads having an external diameter of 100 μm were used and they were prepared in accordance with the schematic view illustrated in FIG. 1. A plurality of beads are reacted in a 0.01% N-(4-maleimidobutyryloxy)succinimide solution (ethanol: 50%, dimethylsulfoxide: 50%) of room temperature for 1 hour, followed by washing with a mixture of 50% ethanol and 50% dimethylsulfoxide to prepare maleimide-modified beads. Then, 24 kinds of probe DNAs are prepared. Beads immobilized with the same kind of probe DNA are made for 16 storing portions arrayed in a row in the x direction and beads immobilized with different kinds of probe DNAs are made for storing portions arrayed in the y direction. The probe DNA is immobilized to the maleimide-modified beads by reacting with synthetic DNA which has a different base sequence and has been modified with 5'-end thiol group. After reaction in a 0.11 nM synthetic DNA-20 mM phosphate buffer (pH 7.0) of room temperature for 1 hour, the reaction mixture is washed successively with a 20 mM phosphate buffer (pH 7.0) solution and water to yield a DNA probe immobilized bead group 42.

The bead storing plate having the thus-prepared beads stored therein is set on a stage of the apparatus as illustrated in FIG. 3. By the above-described procedure, beads 28 having 24 kinds of test probes which differ with each row of the storing portions arrayed in the y direction of a 384-well microtiter plate are introduced one by one in the bead disposing flow channel 14 in the bead array container 12, whereby a bead array is manufactured.

Figure 11:
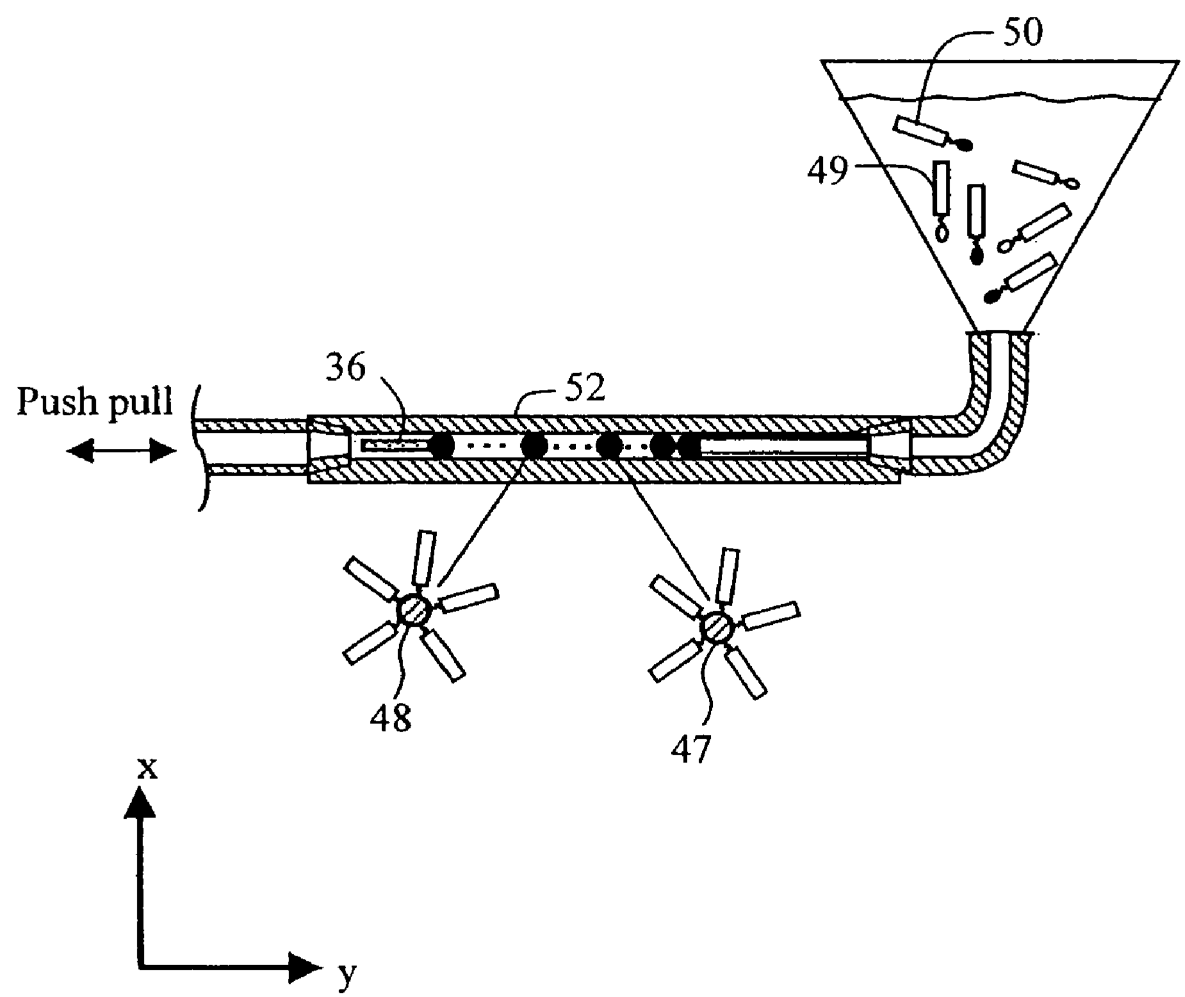
FIG. 11 is a schematic view illustrating a method of hybridization test by using the bead array chip of the present invention.

FIG. 11 is a schematic view illustrating a method of hybridization test by using the bead array chip of the present invention in which DNA-immobilized beads have been arrayed. It illustrates the bead array chip 52 made in this Embodiment and 24 different kinds of beads are arrayed in one bead disposing flow channel 14. In another two bead disposing flow channels 14 of one bead array chip 52, the same bead group is formed. In the cross-sectional view of FIG. 11, only one bead disposing channel 14 is illustrated among three bead disposing flow channels 14.

An example of a hybridization reaction at 45° C. by pouring a 20 mM phosphate buffer (pH 7.0) solution containing a single strand target DNA 49 and a single strand target DNA 50, each in an amount of 1 μM, in the bead disposing flow channel 14 of the bead array chip 52 of FIG. 11 will next be described. The solution was fed to the bead disposing flow channel 14 through a syringe pump or the like. After completion of the reaction, a remaining target DNA which had not contributed to the hybridization reaction was washed successively with a 20 mM phosphate buffer (pH 7.0) solution and pure water, and then dried. With a mercury lamp as a light source, fluorescence microscopic observation of each bead in the capillary of the bead array was performed by successively using a long pass filter for Cy3 and a long pass filter for TexasRed mainly for the emission wavelength of Cy3 an TexasRed, respectively.

Figure 12:
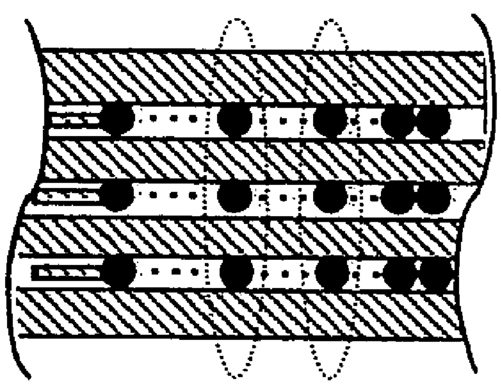
FIG. 12 illustrates the results of the hybridization reaction effected using the bead array chip of the present invention.
Figure 12:
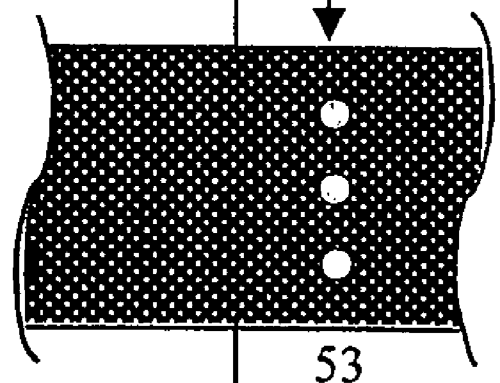
Figure 12:
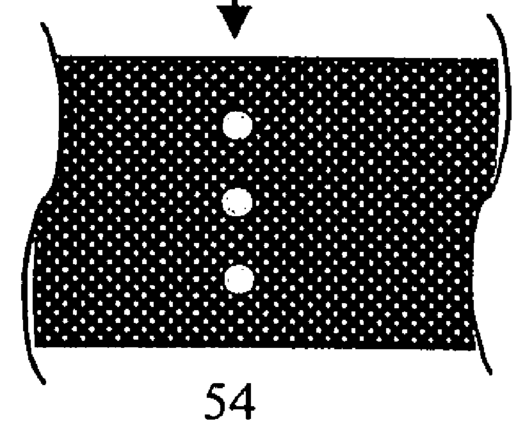

FIGS. 12A to 12C illustrate the results of the hybridization reaction under the above-described conditions by using a bead array chip. FIG. 12A is a transmission microscopic image of the bead array chip 52, FIG. 12B illustrates the fluorescence microscopic observation results through the long pass filter for Cy3, and FIG. 12C illustrates the fluorescence microscopic observation results through the long pass filter for TexasRed.

As is apparent from FIG. 12B and FIG. 12C, among the 24 beads 28 thus arrayed, the 5-th bead and 10-th bead emit fluorescence 53 of Cy3 and fluorescence 54 of TexasRed, respectively. This suggests that the hybridization has occurred between the single strand target DNA 49 and the single strand DNA probe immobilized bead 47 and between the single strand target DNA 50 and the single strand DNA probe immobilized bead 48. By the apparatus in this Embodiment, it is possible to manufacture a DNA probe array in the bead array container 12 by a desired order without having an influence on the probe.

According to the present invention, a bead array chip having biomolecule-immobilized beads arrayed therein can be manufactured efficiently at a low manufacturing cost.

What is claimed is:

1. A bead array chip manufacturing process for manufacturing a bead array chip, the bead array chip having plural kinds of beads arrayed in a predetermined order within a container, the container having a plurality of first channels disposed substantially in parallel with each other and a second channel crossing the plurality of first channels, the process comprising:

lowering a capillary inserted in the second channel; and initiating suction of the capillary, thereby retaining a bead at one end of the capillary;

lifting the capillary to position the capillary such that the bead retained at the one end of the capillary is disposed in a desired channel selected from the plurality of first channels;

terminating the suction of the capillary; and generating a flow of a fluid in the desired channel, thereby releasing the bead into the desired channel.

2. A bead array chip manufacturing process of claim 1, further comprising:

disposing a plurality of containers, and a plurality of capillaries, wherein each capillary is assigned to a container; and simultaneously driving each capillary in the second channel of the container assigned to the capillary.

3. A bead array chip manufacturing process of claim 1, wherein the bead has a surface immobilized with a biomolecular probe.

4. A bead array chip manufacturing process for manufacturing a bead array chip, the bead array chip having plural kinds of beads arrayed in a predetermined order within a plurality of containers, each container having a plurality of first channels disposed substantially in parallel with each other and a second channel crossing the plurality of first channels, the process comprising:

disposing the plurality of containers proximate to a plurality of capillaries, wherein each capillary is assigned to a corresponding container;

simultaneously driving each of the plurality of capillaries in the second channel of the container assigned to the capillary;

initiating suction of the plurality of capillaries, thereby retaining a bead at the end of each capillary;

lifting the capillaries in order to position the capillaries such that each bead retained at the one end of a capillary is disposed at an intersection of the second channel and a desired channel selected from the plurality of first channels in the container assigned to the capillary;

terminating the suction of the capillaries; and generating a flow of a fluid in the desired channels, thereby releasing the beads into the desired channels.

5. A bead array chip manufacturing process of claim 4, wherein each of the beads has a surface immobilized with a biomolecular probe.

6. A bead array chip manufacturing process for manufacturing a bead array chip, the bead array chip having plural kinds of beads arrayed in a predetermined order within a container, the process comprising:

lowering a capillary inserted in the second channel of a container having a plurality of first channels disposed substantially in parallel with each other and having a second channel crossing the plurality of first channels;

initiating suction of the capillary, thereby retaining a bead at one end of the capillary;

lifting the capillary to position the capillary such that the bead retained at the one end of the capillary is disposed at an intersection of the second channel and a desired channel selected from the plurality of first channels;

terminating the suction of the capillary; and generating a flow of a fluid in the desired channel, thereby releasing the bead into the desired channel.

* * * * *